Figure 1:
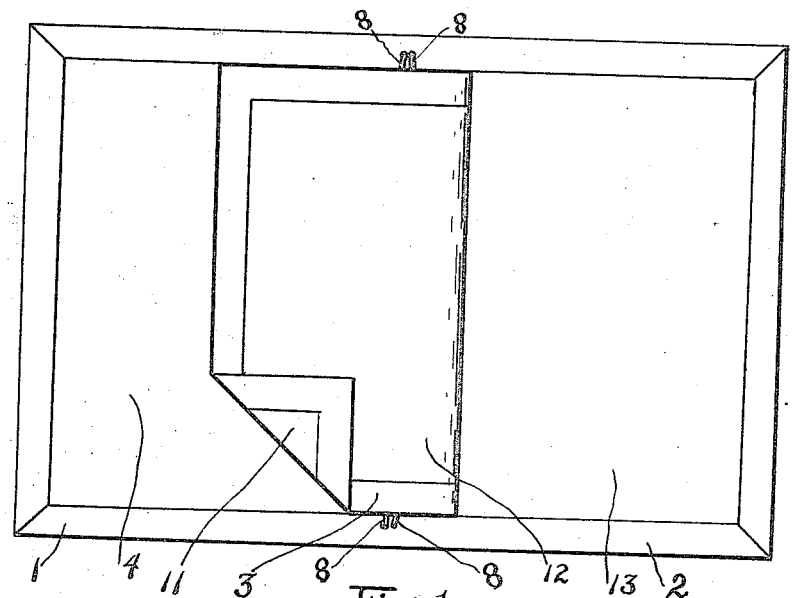

C. H. WILLIAMS.
METHOD AND MEANS OF TEACHING.
APPLICATION FILED MAR. 6, 1918.

1,295,404.

Patented Feb. 25, 1919.

Inventor.
Clara H. Williams.
by
Atty.

UNITED STATES PATENT OFFICE.

CLARA H. WILLIAMS, OF MOOSUP, CONNECTICUT.

METHOD AND MEANS OF TEACHING.

1,295,404.　　　　　　Specification of Letters Patent.　　Patented Feb. 25, 1919.

Application filed March 6, 1918.　Serial No. 220,838.

*To all whom it may concern:*

Be it known that I, CLARA H. WILLIAMS, a citizen of the United States, residing at Moosup, county of Windham, State of Connecticut, have invented certain new and useful Improvements in Methods and Means of Teaching, of which the following is a specification.

This invention relates to pedagogical system and particularly to a system of intensive teaching of fundamentals in any given subject.

Various efforts have been made in text books and otherwise to bring out and impress matters of fundamental nature in the subject taught, but while many of these systems have been of considerable assistance and have undoubtedly constituted valuable additions in the art of imparting knowledge, yet none have been found to be entirely satisfactory in any subject and frequently inapplicable to more than a few subjects.

While the use of text books has been avoided in some systems their utility in points of advantage is so great that they have received practically universal indorsement for almost all subjects and at almost all stages. From my own analysis of text book teaching I find that several difficulties inhere in their nature in the matter of intensive or ultimate instruction.

This is partly physical, partly psychological and partly mixed. Among the physical disabilities of a text book as usually known are its comparative inconveniences in handling, the necessary obscurity of any part of its extended text, the confusion of physically associated but relatively unrelated or unimportant matter tending to mental confusion, and the general inadequacy of provision for overcoming the mental inertia of the mind of the pupil.

In accordance with my system I overcome these difficulties by preparing as an intensive supplement to the text on any subject and preferably to some particular author, first, a study text comprising a permanent analytical topical outline, adapted to constitute a complete and immediate presentation of the whole subject in its broader aspects; second, a plurality of unitary subject groups of related nature to the permanent memorandum and preferably capable of immediate physical association with it in such a way as to bring each unit at the time of its study into such physical association that it may be most conveniently referable and comparable to that which indicates the substance of the whole, and third, a formulation of the project method itself.

These unitary elements are preferably sub-divided or paragraphed, one set constituting a suggestion item by item of matter which must be known definitely and permanently and the other in corresponding paragraphs, careful formulation of the matter to be known.

By my invention I am able to supplement a study of a general text or a course of lectures or experiments or other means of imparting a mass of knowledge by an intensive current presentation of the fundamentals of a period of work while still preserving the intelligent relative bearing of the immediate subject matter to the subject as a whole. As illustrative of my invention I shall show and more particularly describe, both the means and the utilization of simple equipment by which my system may be carried out. To this end I have indicated in the accompanying drawing a system in accordance with my invention comprising a convenient holder and leaf or leaves unit texts, each unit comprising a leaf bearing the suggestive matter to be known, and related leaf or leaves of any formulation of the matter itself.

Throughout the specification where required reference characters are employed to indicate corresponding parts, and in the drawings:

Figure 1 is a plan view of a holder, and

Figure 2:
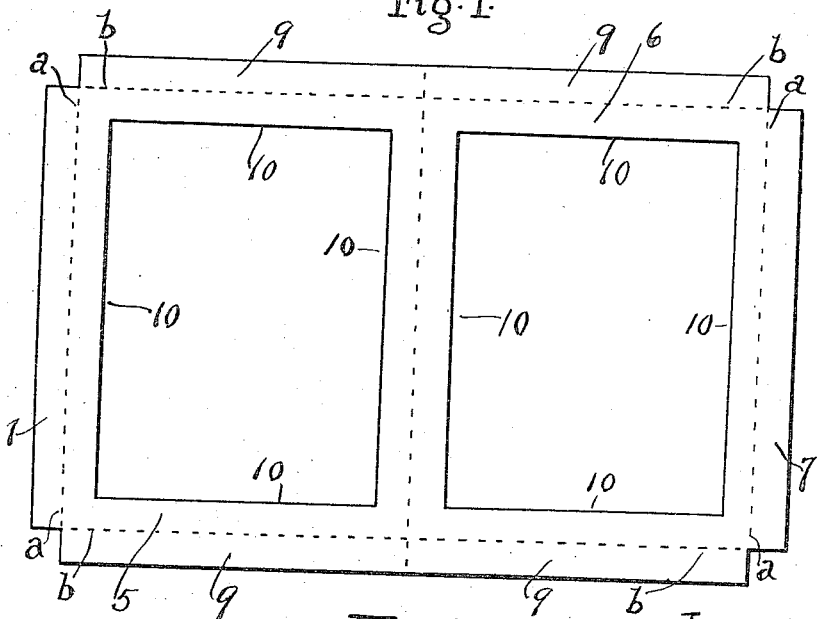

Fig. 2 a detail view of the sheet receiving element.

My holder comprises a suitably joined pair of covers 1 and 2 having a sheet retaining element 3 which I have shown as folded at the corner in order to expose the faces of the covers.

The permanent chart or sheet 4 is preferably mounted on the inside of the front cover 1 and in practice this holder would preferably be reserved for this particular subject so that the sheet 4 may never need be removed or if defaced may be replaced by pasting another permanent sheet 4 thereon.

The member 3 is a cut out blank preferably formed as shown in Fig. 2, of two parts 5 and 6, each having binding flaps 7 which are folded inwardly toward each other on the dotted lines *a—a*. These folded flaps 7 are tucked under a pair of cords 8—8. These cords 8—8 are preferably of elastic material and extend vertically across the cover at its central fold. The top and bottom edges of the members 5 and 6 are provided with flaps 9—9 folded on the dotted lines *b—b*. Each of the members 5 and 6 is cut out centrally as defined by the margin lines 10 to expose the contained removable project sheets 11 and 12 which are assembled in the part 3 back to back and with their text faces exposed through the openings 10. The sheet 11 carries the project items to be learned. It is a quiz sheet. Sheet 12 carries a correspondingly itemized statement of the project. Sheet 13 carries preferably a formulation of the project theory and use.

It is obviously impracticable to set forth characteristic text in the drawing, and the sheets drawn in Fig. 1 are therefore merely identified by reference characters. As illustrative of my invention, however, I have selected characteristic samples of sheets in accordance with my system.

For the purposes of this application I have selected the subject of chemistry of which a suitable characteristic permanent outline for sheet 4 would be as follows:

PROJECT OUTLINE.

Descriptive chemistry.

Project I.  a. Oxygen.  b. Hydrogen.  c. Nitrogen. d. Chemistry of water. e. Chemistry of air.
Project II.  a. Compounds of nitrogen. b. Acids.  c. Bases.  d. Salts.
Project III.  a. Sulfur.  b. Compounds of sulfur. c. Halogens.
Project IV.  a. Sodium, potassium. b. Carbon, Chemistry of flame. c. Compounds of carbon.

Theory of chemistry.

Project V.  Fundamental general principles,
Project VI.  Laws and theories.
Project VII.  a. Solution.  b. Dissociation.
Project VIII.  Combining relations.
Project IX.  Exact formulas.
Project X.  The periodic law.

Industrial processes.

Project XI.  a. Bleaching.  b. Soap.  c. Soda.
Project XII.  a. Illuminating gas.  b. Sulfuric acid.
Project XIII.  a. Ores.  b. Steel.  c. Glass.
Project XIV.  a. Carborundum.  b. Mortar.  c. Concrete.
Project XV.  Pottery.

Selecting as an example of sheet 11, the following would be the indication noted:

PROJECT VII b.

Electrolytic dissociation.

What are the project facts required about:
I. Ionization.
II. Electrolysis.
III. The nature of ions.

The corresponding example for sheet 12 would be:

Electrolytic dissociation.

1. The Swedish chemist, Arrhenius, first proposed the theory of ionization which is that some of the molecules of many compounds, when dissolved in water, dissociate or separate into two parts called ions. The amount of dissociation depends on the nature of the solute and the concentration of the solution.
2. Solutions of compounds which dissociate will conduct electricity and are called electrolytes. The chemical changes which take place when the current passes are called electrolysis.
3. Ions carry electrical charges. Those whose charge is + as metals and hydrogen go to the cathode are called cations and are placed first in the symbol of their compounds. Those having a charge, etc.

Sheet 13 which is preferably permanently mounted on the rear cover 2 of the holder would contain the project formulation as follows:

A project is a scientific method.
The points to be borne in mind about a project are:
1. The steps in solving a project.
2. The authorities we accept.
3. The importance of the scientific method.
It is required to be borne in mind therefore that:
1. In solving a project, we observe and collect facts, by experiment, if possible. We arrange our information to bring out relations between the different facts. We make conclusions.
2. We accept as authority the evidence of our own text books, but one fact if unchallenged, overthrows any theory conflicting with it.
3. The United States has built a Panama Canal, a Liberty motor, and the bridges and tunnels of the Hudson, but the scientific method is more important than these, for if they were destroyed and it remained they would be immediately rebuilt, but if the method were destroyed the loss would be irreparable.

The rear cover 2 may conveniently constitute a pocket for the reception of extra project sets, and the openings 10 of the parts 5 and 6 may be covered by transparent celluloid or like material for the protection of the text sheets.

In carrying out my system pupils would be instructed in the class by lecture or by preliminary reading of the entire text on the subject supplemented if necessary by experiments or laboratory work.

The corresponding project pages 11 and 12 would then be inserted in the holder so that the pupil could take home for study and rehearsal the exact information in project form which was required to be learned.

My system thus provides means for constantly and consistently and conveniently bringing to the pupil's mind the fundamentals of a lesson or subject in a form which can be readily studied, easily learned and the mastery of which can be readily verified either by pupil or parent.

Various modifications may obviously be made in the details of the handling of this matter and certain variations may be made and probably should be made in applying my invention to difficult subjects, all as will be obvious to those familiar with the subject to be taught and the general principles of teaching and all without departing from the spirit of my invention if within the limits of the appended claims.

What I therefore claim and desire to secure by Letters Patent is:

1. A teaching system comprising a text set consisting of a plurality of separable project units each comprising a plurality of paragraph statements of matters to be known and a plurality of related and referable answer groups corresponding to said paragraph statements, a permanent topical outline comprising a table of project subjects, and a holder comprising adjacent leaf retainers for said unit sheets and an adjacent mount for said project outline sheet.

2. A teaching system comprising a text set consisting of a plurality of separable project units each comprising a plurality of paragraph statements of matters to be known and a plurality of related and referable answer groups corresponding to said paragraph statements, a permanent topical outline comprising a table of project subjects and a holder comprising adjacent leaf retainers for said unit sheets and an adjacent mount for said project outline sheet, including a pocket for receiving a sheet of separable units.

3. A teaching device of the class described, comprising a plurality of leaf sets and a holder therefor consisting of a pair of hinged cover members, a pair of elastic retaining cords extending vertically of said cover members at the line of hinge thereof and a sheet holder consisting of a sheet having a central vertical fold, said sheet having similar openings one on each side of said fold, end flaps infolded at the adjacent overlying edges of said folded sheet and top and bottom flaps infolded to retain the contained sheets.

In testimony whereof I affix my signature in presence of two witnesses.

CLARA H. WILLIAMS.

Witnesses:
JOHN G. GREENHALGH,
WM. G. JOWETT.

Copies of this patent may be obtained for five cents each, by addressing the "Commissioner of Patents, Washington, D. C."